Patented Sept. 23, 1952

2,611,778

UNITED STATES PATENT OFFICE 2,611,778

HALOPHENOXYSILANES

John L. Speier, Jr., Pittsburgh, Pa., assignor to Dow Corning Corporation, Midland, Mich., a corporation of Michigan No Drawing. Application September 18, 1950, Serial No. 185,511. In Great Britain November 29, 1949

5 Claims. (Cl. 260—448.8)

This invention relates to halophenoxysilanes.

Phenoxysilanes of the type $R_aSiOC_6H_5(X)_{4-a}$ where $a$ has a value from 0 to 3 and X is halogen, alkoxy or phenoxy are known in the art. These materials have found some uses as heat exchange media, however, they suffer from the disadvantage of being susceptible to hydrolytic cleavage when employed under conditions exposing them to the atmosphere.

It is an object of this invention to prepare phenoxysilanes which are useful as heat exchange media and diffusion pump fluids and which are valuable as intermediates in the synthesis of triorganosilylphenoxysilanes. The latter compounds and their method of synthesis are disclosed and claimed in the applicant's copending application Serial No. 185,516 filed concurrently herewith.

This invention relates to compounds of the type

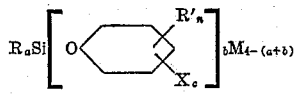

where R is alkyl, R' is alkyl or phenyl, X is a halogen, M is halogen or alkoxy, $a$ has a value from 1 to 3, $b$ has a value from 1 to 3, $c$ has a value from 1 to 2 and $n$ has a value from 0 to 1.

The above halophenoxysilanes may be prepared by reacting a halophenol with a halo or an alkoxy silane. The reaction proceeds by the condensation of the phenolic hydroxyl with the silane halogen or alkoxy to produce the halophenoxysilanes and hydrogen halide or an alcohol.

Reaction between the halophenol and the silane is accomplished by merely bringing the two into contact. Reaction occurs readily at room temperature or below but it is often desirable to heat the reaction mixture in order to drive the reaction to completion.

When ortho-halophenols are employed it is preferred that the reaction be carried out in the presence of a hydrogen halide acceptor such as pyridine in order to enhance the rate of reaction.

The halophenols employed in the method of this invention are commercially available products. They are of the type

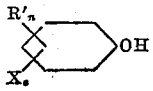

in which R' may be a saturated aliphatic radical such as methyl, propyl, octadecyl and cyclohexyl or a phenyl radical. Preferably the value of $n$ should not be greater than one. X is a halogen and the number of halogen atoms present should be from 1 to 2.

The silane employed herein is of the type $R_aSiM_{4-a}$, wherein R may be any alkyl radical such as methyl, butyl or octadecyl and M may be chlorine or alkoxy. In the silanes $a$ has a value from 1 to 3.

The above type silanes may be prepared by any of the well known methods for preparing organosilanes.

The products of this invention may be either liquids or crystalline solids. They are useful as heat exchange media, thermo expansion fluids and as intermediates in the preparation of triorganosilylphenoxysilanes.

The following examples are illustrative only.

EXAMPLE 1

373 g. of p-chlorophenol was mixed with 340 g. of trimethylchlorosilane and heated to reflux. The mixture was heated 15 to 20 minutes at 155° C. as a rapid stream of HCl evolved. 150 g. excess of trimethylchlorosilane was added and refluxing was continued until no more HCl was produced. Upon distillation of the mixture p-chlorophenoxytrimethylsilane, boiling point 100.5° C. at 14 mm. was obtained.

EXAMPLE 2

219 g. of p-chlorophenol was mixed with 260 g. of dimethyldichlorosilane and heated to reflux for one hour before 150 g. additional dimethyldichlorosilane was added. After the additional hour's reflux, the mixture was distilled whereupon 281 g. of p-chlorophenoxydimethylchlorosilane and 65 g. of bis(chlorophenoxy)-dimethylsilane were obtained.

EXAMPLE 3

129 g. of p-chlorophenol was refluxed with 41.1 g. of silicon tetrachloride. The product was then heated at 300° C. at 7 mm. to remove any excess phenol. Upon cooling the residue, tetra-(p-chlorophenoxy)silicate, melting point 71° C. was obtained.

EXAMPLE 4

A mixture of 163 g. of methyltrichlorosilane and 642.5 g. of p-chlorophenol was refluxed until no more HCl was evolved. The product was distilled whereupon a theoretical yield of tris(p-chlorophenoxy)methylsilane, boiling point 293° C. at 23 mm. was obtained.

EXAMPLE 5

258 g. of o-chlorophenol was refluxed with 592 g. of dimethyldiethoxysilane for 16 to 18 hours and then distilled. A mixture of o-chlorophenoxydimethylethoxysilane and bis(o-chlorophenoxy)dimethylsilane was obtained.

EXAMPLE 6

A mixture of 100 g. of o-iodophenol and 54.2 g. of trimethylchlorosilane was added slowly to 40 g. of pyridine in benzene solution. The mixture was shaken and cooled. The pyridine hydrochloride was removed by filtration and upon distillation of the filtrate a 98 percent yield of o-iodophenoxytrimethylsilane was obtained.

EXAMPLE 7

The procedure disclosed in Examples 1 to 6 were employed to prepare the compounds shown in the table below. In the table Me is a methyl radical and Et is an ethyl radical.

*Table I*

| Structure | B.P. °C. | mm. Press | $n_D^{25°}$ | $d_4^{25°}$ |
|---|---|---|---|---|
| Me₃Si(o-OC₆H₄Cl) | 106 / 212 | 23 / 742 | 1.4910 | 1.042 |
| Me₃Si(p-OC₆H₄Cl) | 101 | 14 | 1.4923 | 1.042 |
| Me₃Si(p-OC₆H₄Br) | 126 | 25 | 1.5123 | 1.252 |
| Me₃Si(2,4-OC₆H₃Cl₂) | 132 | 24 | 1.5070 | 1.150 |
| Me₃Si(3-Me-4-ClC₆H₃O) | 125 | 23 | 1.4963 | 1.034 |
| 2,4(Me₃SiO)₂C₆H₃Cl | 153 | 25 | 1.4818 | 1.022 |
| Me₂Si(o-OC₆H₄Cl)₂ | | | | |
| Me₂Si(p-OC₆H₄Cl)₂ | 230 | 27 | 1.5451 | 1.236 |
| MeSi(p-OC₆H₄Cl)₃ | 287 | 10 | 1.5695 | 1.308 |
| Si(p-OC₆H₄Cl)₄ | M.P. 70° | | | |
| ClMe₂Si(p-OC₆H₄Cl) | 121 | 20 | 1.5033 | 1.173 |
| Me₂Si(p-OC₆H₄Br)₂ | 219 | 1 | 1.5707 | 1.514 |
| Me₂EtSi(p-OC₆H₄Cl) | 134 | 26 | 1.4941 | 1.034 |
| Me₂EtSi(p-OC₆H₄Br) | 142 | 25 | 1.5128 | 1.229 |
| EtOMe₂Si(o-OC₆H₄Cl) | 128 | 22 | 1.4805 | 1.069 |
| EtOMe₂Si(p-OC₆H₄Cl) | 132 | 24 | 1.4815 | 1.069 |
| EtOMe₂Si(p-OC₆H₄Br) | 142 | 25 | 1.4986 | 1.254 |
| Me₃Si(2-C₆H₅-4-Cl-C₆H₃O-) | 151 | 6 | 1.5562 | 1.092 |
| Me₃Si(2-C₆H₅-6-Cl-C₆H₃O-) | 195 | 25 | 1.5582 | 1.101 |
| Me₃Si(o-IC₆H₄O-) | 134 | 25 | 1.5441 | 1.447 |

That which is claimed is:

1. Compounds of the formula

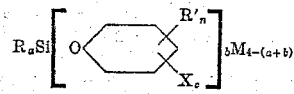

in which R represents an alkyl radical, R' is a radical selected from the group consisting of alkyl and phenyl radicals, X is a halogen atom, M is a substituent selected from the group consisting of halogen atoms and alkoxy radicals, $a$ is an integer from 1 to 3 inclusive, $b$ is an integer from 1 to 3 inclusive, the sum of $a+b$ being not greater than 4, $c$ is an integer from 1 to 2 inclusive, and $n$ is an integer from 0 to 1 inclusive.

2. Compounds of the formula

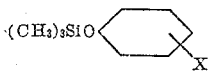

in which X represents a halogen atom.

3. Compounds of the formula

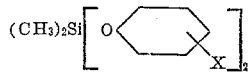

in which X represents a halogen atom.

4. Compounds of the formula

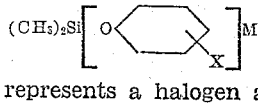

in which X represents a halogen atom and M is a substituent selected from the group consisting of halogen atoms and alkoxy radicals.

5. Compounds of the formula

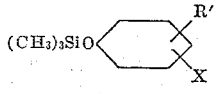

in which R' is a radical selected from the group consisting of alkyl and phenyl radicals and X represents a halogen atom.

JOHN L. SPEIER, Jr.

REFERENCES CITED

The following references are of record in the file of this patent:

UNITED STATES PATENTS

| Number | Name | Date |
|---|---|---|
| 2,242,400 | Loane | May 20, 1941 |
| 2,335,012 | Johnston | Nov. 23, 1943 |